April 7, 1959            J. C. WARD            2,880,991
TORQUE ARM CONNECTION
Filed July 2, 1956            2 Sheets-Sheet 1
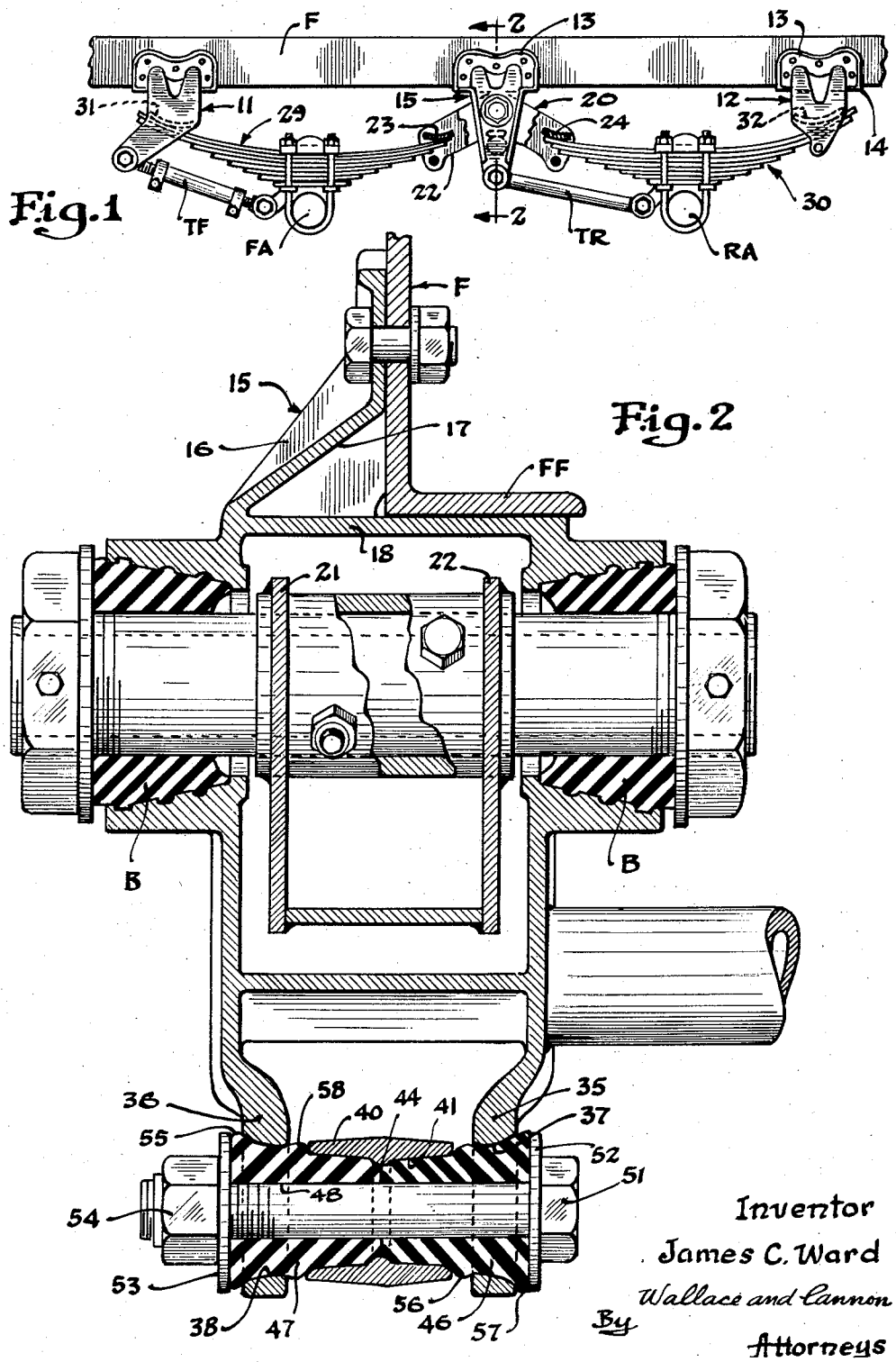
Inventor
James C. Ward
Wallace and Cannon
By Attorneys April 7, 1959　　　　J. C. WARD　　　　2,880,991
TORQUE ARM CONNECTION
Filed July 2, 1956　　　　　　　　　　　　2 Sheets-Sheet 2
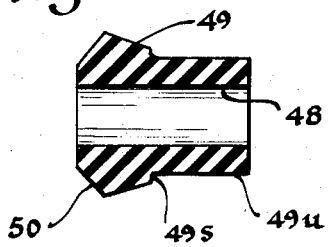
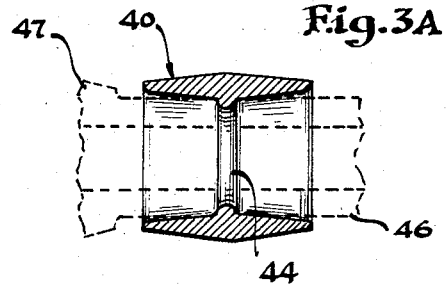
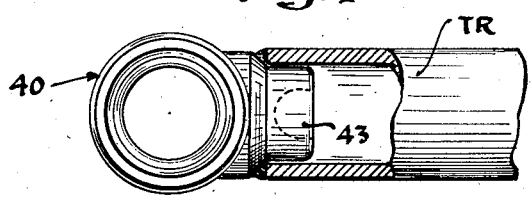
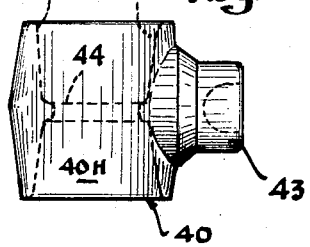
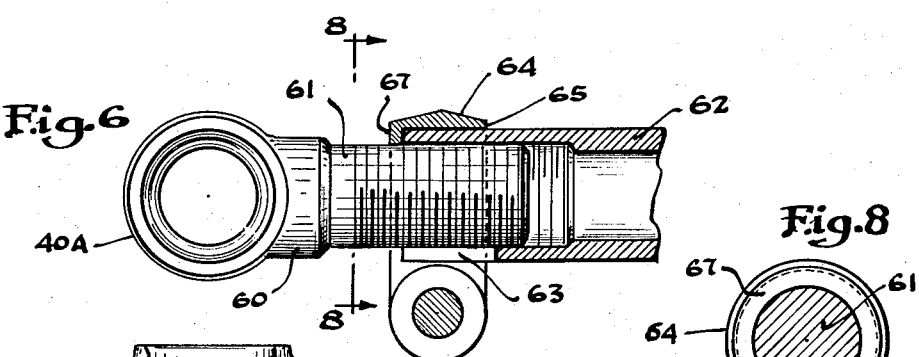
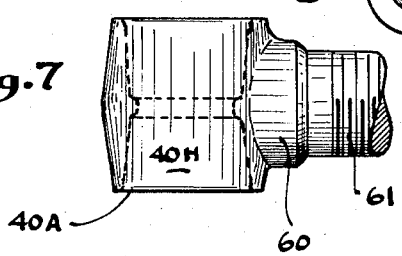
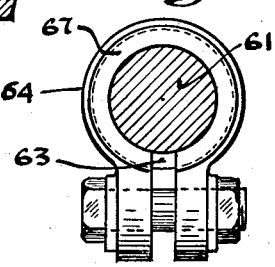
Inventor
James C. Ward
By Wallace and Cannon
Attorneys United States Patent Office 2,880,991
Patented Apr. 7, 1959

2,880,991

TORQUE ARM CONNECTION

James C. Ward, Springfield, Mo., assignor, by mesne assignments, to Alaska Juneau Gold Mining Company, Los Angeles, Calif., a corporation of West Virginia Application July 2, 1956, Serial No. 595,288

5 Claims. (Cl. 267—67)

This invention relates to spring suspensions particularly of the kind adapted for use on heavy duty trucks and trailers that are commonly employed in cross country transportation.

Heavy duty trucks and trailers of this character are usually equipped with two axles at the rear end thereof, and in instances where such axles are independently suspended from the frame of the vehicle, it often happens that an impact impressed on one axle is of such nature that it causes the axle to bear the entire load that should normally be distributed between the two axles. Therefore, it has been proposed heretofore to afford a spring suspension for two such axles that will be of such nature that the stress incident to an impact impressed on one axle may be distributed between the axles and such arrangements have commonly been referred to as tandem spring suspensions, and the present invention particularly has to do with improvements in such suspensions.

In tandem spring suspensions of the prior art certain operative parts have been connected together in such a way that there was metal to metal contact between certain of the parts, and by reason of water, road grime and the like that collects on the parts in the course of use of the suspensions, such parts have become frozen together whereby proper operation of the elements is prevented. Such freezing of the parts also makes separation thereof quite difficult when repair of the tandem was to be effected, and it is therefore an object of the present invention to connect operative elements of a spring suspension of the aforesaid character in such a way that metal to metal engagement will be avoided and thereby freezing of the parts and the like will be avoided.

It is essential in a suspension of the aforesaid character that the two axles be arranged in parallel relation one with the other and also that the longitudinal extent of the axles be normal to the line of travel of the vehicle. In order that this may be realized, it is necessary to arrange the axles so that the longitudinal position of each axle may be varied with respect to the other so that adjustments may be effected to bring the axles into the aforesaid parallel and normal relation.

To this end resort is had to what are called torque arms and one end of each such arm is connected to an axle while the other end is connected to a suitable element on the frame of the spring suspension for the axles and further objects of this are to afford a novel interconnection between the ends of the torque arms and the parts to which these are to be connected; to insure centering of each end of a torque arm with respect to the part to which it is to be connected; and to enable the foregoing and kindred objects of this invention to be realized in an expeditious and economical manner.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a preferred form of my novel apparatus showing the same mounted on the frame of an automotive vehicle;

Fig. 2 is a transverse sectional view in which certain parts are broken away and which is taken substantially on the line 2—2 on Fig. 1;

Fig. 3 is a section of one of the bushings in unmounted position;

Fig. 3A is a sectional view showing in phantom lines the uncompressed bushings;

Fig. 4 is an end elevational view of a connector that is employed at one end of a rigid torque arm of the kind employed in the practice of this invention;

Fig. 5 is a plan view of the connector shown in Fig. 4;

Fig. 6 is a view similar to Fig. 4 showing a connector adapted for use with an adjustable torque arm;

Fig. 7 is a plan view of the connector shown in Fig. 6; and

Fig. 8 is an end view of the clamp that is employed in an adjustable torque arm assembly.

The present invention is illustrated in the drawings as embodied in a tandem spring suspension of the kind described with particularity in my Patent No. 2,653,035 and in such instance a spring suspension of this kind is associated with the opposite side frames as F, Fig. 1, of an automotive vehicle. This spring suspension is adapted to support a front axle FA and a rear axle RA from the frame F.

As described in the aforesaid patent, the tandem spring apparatus of Fig. 1 comprises a front hanger bracket 11 and a rear hanger bracket 12, each including a mounting plate 13 that is adapted to be suitably anchored against the outer face of the frame member F on either side of the vehicle. Each hanger bracket also includes a bottom flange 14 adapted to engage the lower face of each side frame member as F.

Intermediate the front and rear hanger brackets 11 and 12, there is afforded a center bracket 15 likewise including a mounting plate 13 adapted to be suitably anchored to the frame of the vehicle.

As shown in Figs. 2 and 3 the hanger bracket 15 is in the form of a relatively large casting, and the outer surface of this casting includes depending web structure 16 and 17 and a horizontal plate 18 adapted to seat against the lower face of the flange FF of the corresponding side frame member F of the vehicle.

The hangar 15 is adapted to support an equalizer beam 20 for pivotal movement as will be described in more detail hereinbelow. The equalizer beam 20 includes parallel side plates 21 and 22 which project in symmetrical relation in a forward and rearward direction from opposite sides of the bracket 15 as shown particularly in Fig. 1, and at the opposite ends the plates 21 and 22 support respective bearing members in the form of arcuate plates 23 and 24. Corresponding to the front axle FA is a compound leaf spring 29, and corresponding to the rear axle RA is another compound leaf spring 30. The adjacent or inner ends of these springs, it will be observed in Fig. 1, engage tangentally the lower faces of the respective bearing plates 23 and 24, and it is this relation which enables the desired load distribution to be achieved through the equalizer as fully described in my aforesaid patent.

As shown in Fig. 1, the front hanger bracket 11 includes a downwardly bowed arcuate bearing plate 31 against the bottom face of which the forward end of the spring 29 is adapted to bear tangentally, and when the tandem apparatus is in normal position, that is, under equal load conditions with respect to the two axles, the forward end of the spring 29 bears against the bearing member 31 adjacent the forward end thereof.

A similar arcuate bearing plate 32 is provided at the rear hanger bracket 12, and the arrangement is such that the rearward end of the spring 30 normally engages tangentally the lower face of the bearing member 32 adjacent to the rear end thereof. The arcuate configuration of the bearing plates 31 and 32 is such that when the spring 29 is deflected upwardly upon the front axle FA being deflected upwardly by an impact encountered on the road, the spring 29 in effect is straightened so that the forward end thereof travels in a rearward direction along the arcuate surface afforded by the bearing member 31. At the same time, the rearward end of the spring 29 in effect travels in a rearward direction on the bearing member 23 of the equalizer beam 20. This movement is manifest in the equalizer beam 20 pivoting clockwise as viewed in Fig. 1 so that the bearing member 24 thereof is brought to bear with a downwardly directed force against the forward end of the spring 30 engaged therewith. This has the effect of distributing to the spring 30 part of the stressing of the spring 29 due to the impact encountered by the axle FA to thereby achieve the desired load distribution. The converse of the foregoing will be readily apparent, and is fully described in my aforesaid patent.

The equalizer beam 20 is mounted for pivotal movement in the hanger 15 by resorting to a suitable bearing structure B, Fig. 2, which may be as shown in the accompanying drawings as related to my co-pending application Serial No. 541,895 filed October 21, 1955, now Patent No. 2,853,325, dated Sept. 23, 1958. However, if desired, a bearing like that shown in my aforesaid patent may be afforded for the equalizer.

In order that the hereinabove described adjustment of the axles as FA and RA may be affected, resort is had to torque arms as TF and TR and the present invention pertains to the manner in which the ends of these torque arms are connected to elements in the spring suspension. In the present instance, the torque arm TF is adjustable, as will be explained hereinafter, while the torque arm TR is rigid.

The suspension shown in Fig. 1 is adapted to be mounted on the lefthand side of a vehicle and it will be understood that a similarly arranged suspension is mounted on the righthand side of the vehicle, brackets for mounting the same being reversed from those shown in Fig. 1 to enable such suspension to be connected to the frame as of the vehicle. In an instance where the front torque arm TF of a lefthand suspension like that shown in Fig. 1 is adjustable while the rear torque arm TR of this particular suspension is rigid, then in the suspension adapted for use on the righthand side of the vehicle, the rear torque arm is arranged to be adjustable and the front torque arm is of the rigid type. This arrangement of the torque arms enables the aforesaid adjustment of the axle FA and RA relative to each other to be expeditiously effected. It will be understood, however, that insofar as either a righthand or a lefthand suspension may be concerned, each torque arm in one suspension will be of the rigid type while each torque arm in the other suspension will be of the adjustable type for this also enables the desired relative adjustment of the axles to be effected. In this latter circumstance, it is found to be advantageous to include the adjustable torque arms in the suspension adapted to be mounted on the righthand side of the vehicle.

While the novel connection of this invention is advantageously employed in association with torque arms in a spring suspension of the above-described kind, it will be apparent to those skilled in the art that resort may be had to the connection to which this invention pertains in an instance where adjustment of the relative portions of the front and rear axles attached to the suspension is affected through the intermediary of the means connecting such axle to other elements of the suspension.

As best shown in Figs. 1 and 2, the bracket in which the equalizer beam 20 is mounted for pivotal movement includes a downwardly extending yoke affording ears or mounting plates 35 and 36. As best shown in Figs. 2 and 3 aligned openings 37 and 38 are respectively provided in the ears 35 and 36. The walls of each such opening are desirably formed to be of arcuate configuration so arranged that the end of the opening in the outer face of each ear is of larger diameter than the end of such opening on the inner face of the ear, such arrangement therefor affording what in effect is a tapered wall for each opening.

The yoke afforded by the plates 35 and 36 is adapted to have a T-shaped connector like that shown in Figs. 4 and 5 disposed therebetween. Inasmuch as the rigid torque arm TR, Fig. 1, is to be connected to this yoke the connector 40 includes a substantially cylindrical body or head 40H having an opening 41 extended axially therethrough. A boss 43 is provided on the connector 40 in normal relation to the head and affords a stud 43 into which one end of the solid piece of steel tubing or the like affording the torque arm TR may be passed, and when the cylindrical portion of the boss 43 has been properly seated in one end of such tubing, these parts are united in a suitable manner as by welding.

Midway between the ends of the opening 41, a radially inwardly extending rib 44 is provided, and the walls of the opening 41 outwardly of this rib on either side thereof are desirably tapered symmetrically as shown in Fig. 3A so that the ends of the opening 41 at the respective outer sides of the connector head are of greater diameter than the portion of this opening adjacent the rib 44. Moreover, the ends of the openings 41 are desirably filleted as indicated at 45, Fig. 5.

Rubber bushings as 46 and 47, Fig. 3, concentric at all parts or sections are adapted to be passed through the openings 37 and 38 and into the opening 41 in the connector 40. Each bushing has a centrally located axial opening 48 of uniform diameter extending therethrough. The end portion 49 of each bushing adapted to seat in an opening as 38 is preferably formed to be of greater diameter than the portion of the bushing that is to be extended into one side of the opening 41, and desirably the peripheral portion of this enlarged end section 49 is tapered to be substantially complemented to the tapered configuration of the opening 38 into which it is to be seated. The free end portion of the enlarged portion 49 is advantageously chamfered or sloped inwardly toward the opening 48 as indicated at 50 for the purpose to be explained presently. Further, each bushing includes an annular shoulder 49S at the inner end of tapered portion 49, providing a substantially flat annular face, and inwardly of the shoulder 49S the outer diameter of the bushing is uniform at 49U.

When a connector as 40 is to be disposed between arms as 35 and 36, the connector is moved into position between these elements with the opening 41 therein in alignment with the openings as 36 and 37 in the arms as 35 and 36. Thereafter the bushings 46 and 47 are respectively passed through the openings 37 and 38 and are extended into the opening 41 to have the inner ends thereof respectively engaged with opposite sides of the rib 44 as best shown in Fig. 3A. In order to insure that the bushings as 46 and 47 may be disposed in the above-described manner, it is preferable to lubricate the exterior surfaces thereof. In the instance where the bushings as 46 and 47 are formed from rubber, any suitable rubber lubricant may be employed and it has been found that water affords satisfactory lubrication in such circumstances. Of course, resort may be had to any suitable lubricant compatible with the resilient material of which the bushings 46 and 47 are formed.

In order to interconnect and retain the elements in their desired positions, a bolt 51 is provided. A washer 52, of a diameter substantially equal to the largest diameter of the bushing 46, is associated with the head of the bolt 51 which is then passed through the aligned openings as 48 in the bushings 46 and 47. Another washer 53 is disposed about the threaded end of the bolt to engage the outer end portion of the bushing 47, and the diameter of this washer is substantially equal to the largest diameter of the bushing 47. A nut 54 is run on to the threaded end portion of bolt 51. In the course of running the nut 54 inwardly of the bolt 51, the washers 52 and 53 are respectively drawn into engagement with adjacent portions of the bushings 46 and 47. As continued movement of the nut 54 toward the head of the bolt 51 is effected, the bushings 46 and 47 are placed under compression sufficient to cause the peripheral shoulder portion as 49S of the bushing 47 to bear against the adjacent end of the connector 40 and to bulge radially outwardly as indicated at 58 affording a separating flange between the inner face of the ear 46 and the end of the connector. At this same time, the tapered portion 49 of the bushing is wedged tightly in the opening 38, and the outer end portion of the bushing 47 bulges as indicated at 55 to be disposed as a limiting flange between the outer face of the ear 36 and the adjacent face of the washer 53. By chamfering the bushing at 50, the bulge or flange at 55 is found to be of optimum size preventing excessive wear. The bushing 46 is similarly bulged as indicated at 56 and 57. The lubricant applied to the peripheries of the bushings 46 and 47 insures that the ends of these bushings firmly seat against opposite sides of the rib 44 and the compression to which these bushings are subjected in the manner above described causes the adjacent end portions thereof to flow over the rib 44 into abutting relation one with the other. Furthermore, the lubricant insures that the bushings freely move over the surface of the opening 41 in a connector as 40 whereby the intermedial portions of these bushings do not tend to adhere to the wall of the opening 41. Moreover, this also insures that the bushings are subjected to substantially uniform compression in that the lubricant assures that the bushings in moving over the walls of the openings as 36 and 37 to further augment and insure this.

Since the inner end portion of the bushings as 46 and 47 are abutted midway between the sidewalls of the rib as 44, the ends of the connector as 40 are uniformly spaced from the inner faces of the ears 35 and 36 respectively so that the connector 40 is centered in the yoke afforded by the ears 35 and 36. The bulges as 56 and 58 afforded by reason of compressing the bushings 46 and 47 afford a rubber cushion intermediate the adjacent end of the connector 40 and the juxtaposed ear and are therefor effective to prevent metal to metal contact between the connector 40 and one or the other of the ears of the yoke in which it is disposed. Likewise the bulges 57 and 55 on the bushings 46 and 47 respectively space the adjacent face of washers as 52 and 53 from the outer faces of the ears as 35 and 36 and here again, metal to metal contact is prevented. Inasmuch as metal to metal contact is prevented by this arrangement, objectionable wear of the various elements is avoided and furthermore, by reason of the resilient material of the bushings as 46 and 47 strains impressed upon the torque arm of which the connector 40 is a part are more directly transmitted to the part of the frame of the suspension to which the end of the torque arm is connected. Inasmuch as some canting of the connector as 40 will be effected in the course of the use of the suspension of which the same is a part, the disposition of the bulges as 56 and 58 between the ends of the connector and the inner face of the ear of the yoke in which the same is disposed insures that the connector 40 may cant as required, such canting merely effecting greater compression on one part of the rubber bushing arrangement about the bolt 51 and the parts are so dimensioned that the volume of each bushing as 46 and 47 is sufficient to compensate for such canting of the connector 40 as may be expected.

While bulges of 56 and 57 are advantageously afforded to function as hereinabove described, it should be understood that the abutting of the inner ends of the bushings 46 and 47 substantially midway between the sidewalls of the rib 44 and the equal compression to which such bushings are subjected is effective to center the connector 40 between the inner faces of ears 35 and 36. So to do affords sufficient clearance between the ends of the connector 40 and the respective inner faces of ears as 35 and 36 to mitigate against the likelihood of the connector 40 coming into engagement with the adjacent inner face of either one of the ears between which it is disposed.

Furthermore the compression to which the bushings 46 and 47 is subjected is sufficient to firmly anchor the bushing 46 in the opening 37 and the opening 41 of the connector 40 and the bushing 47 in the opening 38 and the opening 41 and consequently, relative movement between the connector end 40 and the ears 35 and 36 is absorbed in the bushings as 46 and 47 and relative movement between these bushings and the parts in which they are mounted is avoided. So to do prevents galling or other detrimental action on the bushings and insures that the same will function satisfactorily for protracted periods.

The aforesaid centering of the connector 40 between the ears 35 and 36 insures balancing of spacing between ends of the connector and the adjacent inner faces of the juxtaposed ears. If the spacing between one end of the connector and the adjacent face of the juxtaposed ear was greater than the spacing between the other end of the connector and the adjacent face of the ear to which it is juxtaposed, then when the bushings were subjected to compression, there would be much more bulging of the flexible material of the bushings through the larger of the spaces thus afforded. Consequently, it is important that the compression to which the bushings as 46 and 47 is subjected be equalized therebetween and be sufficient to insure that the connector 40 will be maintained centered between the ears as 35 and 36.

Still further, the relative proportioning of the yoke, connector and the bushings, and the degree of compression to which the bushings are subjected, are related to the strains that will be impressed thereon as an incident to movement of the axle to which an end of the torque arm, of which the connector is a part, is secured, for by reason of the centering of the connector as 40 in the yoke as described hereinabove and the proportions of the areas into which the material of the bushing may bulge, it is insured that applied strains will not affect such displacement of the parts as to enable greater flow or bulging of the bushing material at one point than at another, and this insures that the axles are maintained in desired relation one to the other and with respect to the frame of the vehicle supported thereby. This is particularly advantageous because it materially reduces wear of the tires mounted on the wheels carried by the axles of the suspension.

It will be understood that a yoke corresponding to that afforded by the ears 35 and 36 is associated with the axle RA and that a connector corresponding to the connector 40 is mounted in this yoke in a manner described hereinabove with particular reference to the mounting of the connector 40 between the yoke afforded by the ears 35 and 36. Moreover the end of the rigid tube opposite that mounted on the boss 43 of the connector 40 is disposed about a similar boss on the connector associated with the yoke secured to the axle RA. Resultantly, each end of the torque arm TR is connected to a yoke of which one is afforded on a part of the frame of the suspension and the other is afforded on the axle secured to the suspension. Consequently, the hereinabove described advantages occurring from the connection employing bushings as 46 and 47 are realized at each end of the rigid torque arm.

In Figs. 6, 7 and 8, I have shown the elements of an arrangement to which resort is had to afford an adjustable torque arm as TF. In these views, elements of the connection corresponding to those described hereinabove are designated by the same reference characters employed for the elements hereinabove but in Figs. 6, 7 and 8 the letter A is added to such reference characters; thus, the connector 40A shown in Figs. 6 and 7 corresponds to the connector 40 described hereinabove except that instead of having a boss as 43 on the connector 40A, a relative elongated boss 60 is provided which has the outer end portion thereof screw threaded as indicated at 61. In an instance where an adjustable torque arm TF is to be provided, a connector 40A is provided at each end of the torque arm and a connecting tube as 62 is provided. The inner part of each end of the tube as 62 is screw threaded so as to be provided with oppositely directed threads at each end, and the threaded portion 61 provided on a boss as 60 is screw threaded in a direction to be complemental to the screw threads 61 on the end of the tube 62 that is to be screw threaded thereonto. Consequently, by rotating tube 62 relative to the threaded boss portions 61 at opposite ends thereof, the connectors as 40A at opposite ends of the tube may be moved toward or away from each other and thereby the length of the torque arm afforded by this arrangement may be adjusted. Once the desired length of the torque arm has been established, the end portions of the tube 62 are secured to the threaded portion of 61 extending therein to this end, the screw threaded portion at each end of the tube as 62 is slotted at 63, Fig. 8, for an appreciable portion of the extent of such screw threaded portion.

By disposing a clamp as 64 about the slotted end portion of a tube as 62 and tightening such clamp, the tube as 62 is connected to the threaded boss as 61 in such a way as to prevent relative movement therebetween and thereby the adjusted length of the torque arm is maintained. The clamp 64 has a tight press fit on the end of the tube 62, and thus the diameter at the inner end 65 of the clamp closely approximates that of the tube 62. The opposite or outer end of the clamp is formed with an annular shoulder 67 which is adapted to engage the end of the tube 62 as shown in Fig. 6 to limit and confine the clamp to the end of the tube.

In my aforesaid patent, I use eccentric rubber bushings for the purpose of imparting adjustability to torque arms, and moreover the arrangement does not include the self-centering aspects of the present invention.

Hereinabove I have described the manner in which the respective ends of adjustable and rigid torque arms may be connected to the elements of a spring suspension to which such torque arms are to be connected. It is to be understood, however, that resort may be had to my novel connection between a torque arm and a spring suspension in various types of suspensions. Consequently, it will be understood that my invention is not limited to use in a suspension of the kind described hereinabove and shown in the accompanying drawings since this novel connection will be advantageous when used in association with any type of torque arm in any kind of a spring suspension.

It will be manifest that the above-described arrangement enables the hereinabove set forth objects of this invention to be realized and while I have illustrated and described the preferred embodiment of this invention, it is to be understood that this is capable of variation and modification, and I therefore do not wish to be limited to the precise details set forth, but desire to avail myself of such changes and alterations as fall within the purview of the following claims.

I claim:

1. In a connection of the kind described, means affording spaced apart relatively immovable mounting plates having apertures formed therein that are aligned one with the other, said apertures being progressively and uniformly tapered and at the outer faces of said plates having diameters larger than the diameters of the apertures at the inner faces of said plates, a connector having a head disposed between the inner faces of said plates and being normally movable laterally relative to said plates and provided with an axial opening therethrough that is aligned with said apertures, said head at each side being spaced inwardly of the corresponding inner faces of the mounting plates, a rib centered on and formed about the wall of the connector head that affords said axial opening, the opening in said head being defined by symmetrical portions on either side of said rib that are of progressively larger diameter outwardly of said rib, a pair of resilient bushings passed in a lubricated state through each such aperture and in to the opening in said head, said bushings having inner portions of uniform diameter and inner ends abutting said rib and one another, said bushings having annular shoulders defining the outer limits of said inner portions, said shoulders in the unmounted state of the bushings being of substantially larger diameter than the diameter of said axial opening in said head, said bushings outwardly of said shoulders being of progressively larger diameter at portions that are complementally seated in the apertures in said mounting plates, said bushings having axial openings formed through the centers thereof, and bolt means passed through the axial openings in said bushings holding said bushings in place under uniform compression with outer ends of said bushings bulged as peripheral flanges against the outer faces of said plates, intermediate portions of said bushings adjacent the shoulders thereof bulged as peripheral separating flanges in the aforesaid spaces that exist between the sides of said head and the inner faces of said plates, and portions of said bushings between said flanges wedged tightly in the apertures in said plates.

2. In a connection of the kind described, means affording spaced apart relatively immovable mounting plates having apertures formed therein that are aligned one with the other, said apertures at the outer faces of said plates having diameters larger than the diameters of the aperture at the inner faces of said plates, a connector having a head disposed between the inner faces of said plates and being normally movable laterally relative to said plates and provided with an axial opening therethrough that is aligned with said apertures, said head at each side being spaced inwardly of the corresponding inner faces of the mounting plates, a rib centered on and formed about the wall of the connector head that affords said axial opening, the opening in said head being defined by symmetrical portions on either side of said rib that are of progressively large diameter outward of said rib, a pair of resilient bushings passed through each such aperture and into the opening in said head, said bushings having inner portions of uniform diameter and inner ends abutting said rib, said bushings having annular shoulders affording substantially flat annular faces defining the outer limits of said inner portions, said shoulders in the unmounted state of the bushings being of substantially larger diameter than the diameter of said axial opening in said head, said bushings outwardly of said shoulders being of progressively larger diameter at portions that are complementally seated in the apertures in said mounting plates, said bushings having axial openings formed through the centers thereof, and means passed through the axial openings in said bushings holding said bushings in place under uniform compression with outer ends of said bushings bulged as peripheral flanges against the outer faces of said plates, intermediate portions of said bushings adjacent the shoulders thereof bulged as peripheral separating flanges in the aforesaid spaces that exist between the sides of said head and the inner faces of said plates, and portions of said bushings between said flanges wedged tightly in said apertures in said plates.

3. In a connection of the kind described, means affording spaced apart mounting plates having apertures formed therein that are aligned one with the other, said apertures being progressively and uniformly tapered and at the outer faces of said plates having diameters larger than the diameters of the apertures at the inner faces of said plates, a connector having a head disposed between the inner faces of said plates and being normally movable laterally relative to said plates and provided with an axial opening therethrough that is aligned with said apertures, said head at each side being spaced inwardly of the corresponding inner faces of the mounting plates, a rib formed in centered relation on the inner wall of the connector head that affords said axial opening, a pair of resilient bushings passed through each such aperture and in to the opening in said head, said bushings having inner portions of uniform outside diameter and inner ends abutting said rib, said bushings having annular shoulders which afford substantially flat faces disposed toward one another and which define the outer limits of said inner portions of the bushings, said shoulders in the unmounted state of the bushings being of substantially larger diameter than the diameter of said axial opening in said head, said bushings outwardly of said shoulders being of progressively larger diameter at portions that are complementally seated in the apertures in said mounting plates, said bushings having axial openings formed through the centers thereof, and means passed through the axial openings in said bushings holding said bushings in place under uniform compression with outer ends of said bushings bulged as peripheral flanges against the outer faces of said plates, intermediate portions of said bushings adjacent the shoulders thereof bulged as peripheral separating flanges in the aforesaid spaces that exist between the sides of said head and the inner faces of said plates, the flat faces of said shoulders engaged with the sides of said head, and portions of said bushings between said flanges wedged tightly in the apertures in said plates.

4. In an automotive spring suspension of the kind described wherein an axle of the vehicle is maintained in alignment by a torque arm, bracket means for supporting one end of such a torque arm and affording spaced apart relatively immovable mounting plates having apertures formed therein that are aligned one with the other, said apertures being progressively and uniformly tapered and at the outer faces of said plates having diameters larger than the diameters of the apertures at the inner faces of said plates, a connector at said one end of the torque arm and having a head thereon disposed between the inner faces of said plates, said head being normally movable laterally relative to said plates and provided with an axial opening therethrough that is aligned with said apertures, said head at each side being spaced inwardly of theh corresponding inner faces of the mounting plates, a rib centered on and formed about the wall of the connector head that affords said axial opening, the opening in said head being defined by symmetrical portions on either side of said rib that are of progressively larger diameter outwardly of said rib, a pair of resilient bushings passed in a lubricated state through each such aperture and in to the opening in said head, said bushings having inner portions of uniform outside diameter and inner ends abutting said rib and one another, said bushings having annular shoulders formed to provide substantially flat faces disposed toward one another and which define the outer limits of said inner portions of the bushings, said shoulders in the unmounted state of the bushings being of substantially larger diameter than the diameter of said axial opening in said head, said bushings outwardly of said shoulders being of progressively larger diameter at portions that are complementally seated in the apertures in said mounting plates, said bushings having axial openings formed through the centers thereof, and bolt means passed through the axial openings in said bushings holding said bushings in place under uniform compression with outer ends of said bushings bulged as peripheral flanges against the outer faces of said plates, intermediate portions of said bushings adjacent the shoulders thereof bulged as peripheral separating flanges in the aforesaid spaces that exist between the sides of said head and the inner faces of said plates, the flat faces of said shoulders engaged with the sides of said head, and portions of said bushings between said flanges wedged tightly in the apertures in said plates.

5. In an automotive spring suspension of the kind described wherein an axle of the vehicle is maintained in alignment by a torque arm, bracket means for supporting one end of such a torque arm and affording spaced apart relatively immovable mounting plates having apertures formed therein that are aligned one with the other, a connector at said one end of the torque arm and having a head thereon disposed between the inner faces of said plates, said head being normally movable laterally relative to said plates and provided with an axial opening therethrough that is aligned with said apertures, said head at each side being spaced inwardly of the corresponding inner faces of the mounting plates, a rib formed in centered relation on the inner wall of the connector head that affords said axial opening, the opening in said head being defined by symmetrical portions on either side of said rib that are of progressively larger diameter outwardly of said rib, a pair of resilient bushings passed through each such aperture and in to the opening in said head, said bushings having inner portions of uniform outside diameter and inner ends abutting said rib, said bushings having annular shoulders formed to provide substantially flat faces disposed toward one another and which define the outer limits of said inner portions, said shoulders in the unmounted state of the bushings being of substantially larger diameter than the diameter of said axial opening in said head, said bushings outwardly of said shoulders being of such dimension as to complementally seat in the aperture in said mounting plates, said bushings having axial openings formed through the centers thereof, and bolt means passed through the axial openings in said bushings holding said bushings in place under uniform compression with outer ends of said bushings bulged as peripheral flanges against the outer faces of said plates, intermediate portions of said bushings adjacent the shoulders thereof bulged as peripheral separating flanges in the aforesaid spaces that exist between the sides of said head and the inner faces of said plates, the flat faces of said shoulders engaged with the sides of said head, and portions of said bushings between said flanges wedged tightly in the apertures in said plates.

References Cited in the file of this patent

UNITED STATES PATENTS

| | | |
|---|---|---|
| 1,817,438 | Henry et al. | Aug. 4, 1931 |
| 1,961,536 | Thiry | June 5, 1934 |
| 2,245,382 | Bradley et al. | June 10, 1941 |
| 2,308,967 | Kuss | Jan. 19, 1943 |
| 2,416,243 | Thiry | Feb. 18, 1947 |
| 2,653,035 | Ward | Sept. 22, 1953 |

FOREIGN PATENTS

| | | |
|---|---|---|
| 2,684 | Australia | of 1926 |
| 718,389 | Great Britain | Nov. 10, 1954 |